PULSE CODE MODULATION DEMODULATOR

Filed Oct. 23, 1948 2 Sheets-Sheet 1

INVENTOR.
HENRI FEISSEL
BY
R P Morris
ATTORNEY

Sept. 8, 1953 H. FEISSEL 2,651,716

PULSE CODE MODULATION DEMODULATOR

Filed Oct. 23, 1948 2 Sheets-Sheet 2

INVENTOR.
HENRI FEISSEL

BY

ATTORNEY

Patented Sept. 8, 1953 2,651,716

UNITED STATES PATENT OFFICE 2,651,716

PULSE CODE MODULATION DEMODULATOR

Henri Feissel, Paris, France, assignor to International Standard Electric Corporation, New York, N. Y., a corporation of Delaware Application October 23, 1948, Serial No. 56,243
In France November 8, 1947

3 Claims. (Cl. 250—27)

The present invention relates to impulse transmission systems and more particularly to a system for translating amplitude modulated pulses into coded pulse groups.

It is an object of the invention to provide an improved and simplified pulse code modulation modulator and an improved and simplified pulse code modulation demodulator.

The above mentioned and other features and objects of the invention will become more apparent and the invention itself, though not necessarily defined by said features and objects, will be best understood by reference to the following description of an embodiment of the invention taken in conjunction with the accompanying drawings wherein.

Figure 1:
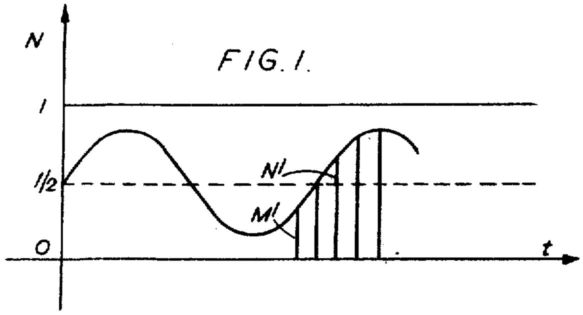
Figs. 1 and 2 are sets of curves useful for the understanding of the invention.

Referring to Fig. 1, I show a modulating signal and a sequence of impulses modulated in amplitude according to said signal. It will be assumed in order to facilitate the description that the amplitudes of these impulses vary between two reference levels, 0 and 1.

According to a feature of the invention, a certain combination of constant amplitude impulses are transmitted in time sequence for each amplitude modulated impulse. The signals transmitted are characterized by the fact that impulses are or are not transmitted at given instants. It is known that the possible number of combinations of such a code comprising a maximum of $n$ impulses is equal to $2^n$. To this effect the first impulse is made to correspond to the amplitude ½, the second to amplitude ¼, the third to amplitude ⅛ and the $n$th to amplitude $½^n$.

For any given amplitude comprised between the reference levels 0 to 1 it is thus possible to find a code combination of $n$ pulses corresponding to the said amplitude with an approximation of $½^n$.

The purpose of the coding arrangement is to translate an impulse of a given level into the corresponding nearest code combination of constant amplitude impulses, and the purpose of the decoder is to translate said code combination into single impulse whose level approximates the amplitude of the original impulse.

According to a preferred embodiment of the invention a coding arrangement will now be described.

Let I be an impulse of level $N_1$ comprised between two reference levels 0 to 1. The amplitude $N_1$ is compared to level ½; if $N_1$ is greater than ½ a first code impulse is transmitted and an impulse $I_2$ of level $N_2=2(N_1-½)$ is produced. If $N_1$ is less than ½ no first code impulse is transmitted and an impulse $I_2$ of level $N_2=2N_1$ is transmitted to the following stage. In either case the impulse $N_2$ transmitted to the next stage is comprised between 0 and 1.

The impulse of amplitude $N_2$ is then compared to level ½. If $N_2$ is greater than ½ a second code impulse is transmitted and an impulse $I_3$ of level $N_3=2(N_2-½)$, is produced. If $N_2$ is less than ½ no second code impulse is transmitted and an impulse $I_3$ of amplitude $N_3=2N_2$ is transmitted to the next stage. In both cases $N_3$ is comprised between 0 and 1. This process is repeated $n$ times, at which time the desired degree of approximation is attained.

Figure 3:
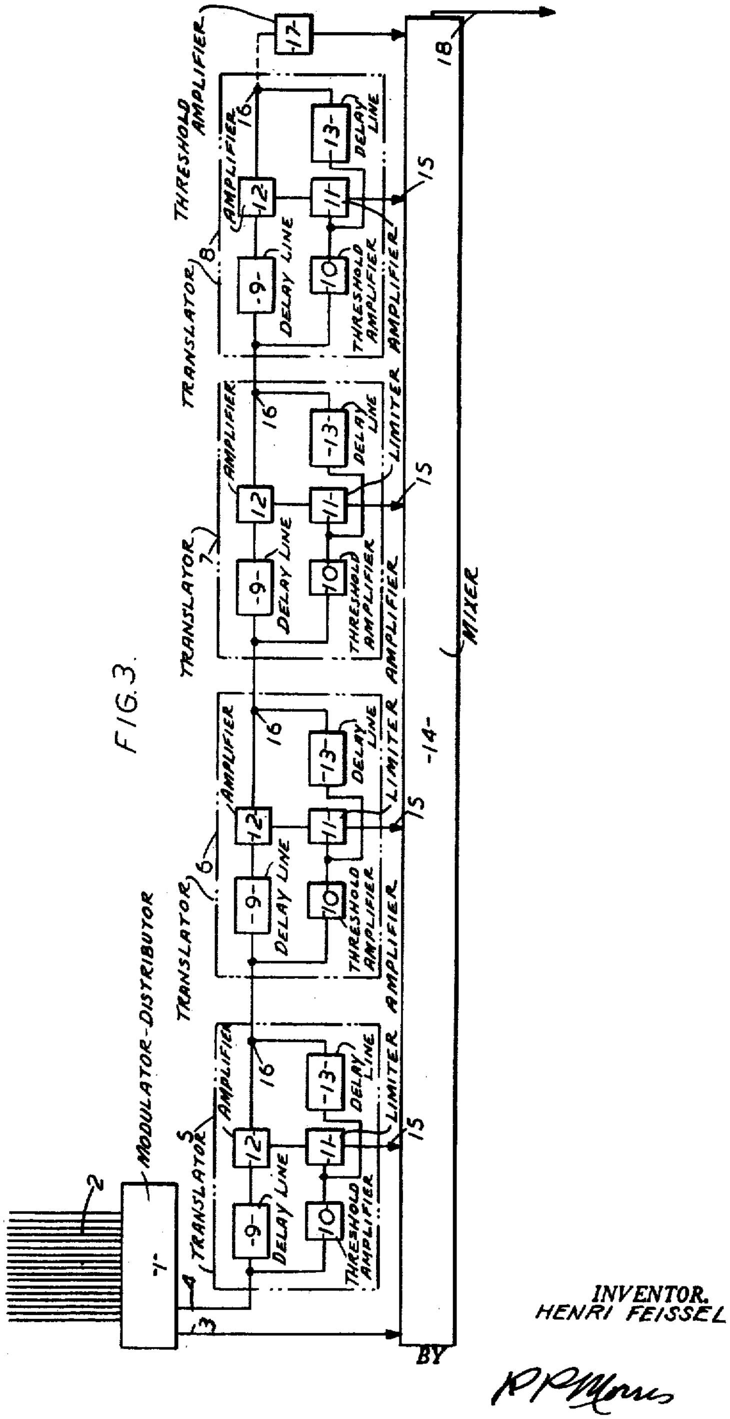
Fig. 3 is a block diagram of a coding arrangement incorporating features of the invention.

The operation of the coding arrangement will be better understood from the following description of the embodiment shown in Fig. 3, which represents a coding arrangement for a 5 unit code.

This coding arrangement comprises a modulator-distributor 1 to which are connected a number of transmission channels 2, for example voice frequency telephone channels. The modulator-distributor produces on line 3 reference impulses which are used for synchronization and on line 4 amplitude modulated impulses which are directed respectively to devices 5, 6, 7, 8 and 17 which are provided for translating amplitude modulated impulses into coded pulse groups.

Each of the devices 5, 6, 7 and 8 comprises a delay line 9 for delaying the impulses by a length of time equal to the time interval separating two successive coded impulses. Each also comprises a threshold amplifier 10 with a voltage amplification equal to 2 and arranged such that it amplifies the fraction of the input impulse applied to it which exceeds the one-half level. Each of the devices 5, 6, 7 and 8 also comprises a limiter-amplifier 11 which limits the amplitude of the impulse from 10 to a constant level chosen for the coded impulses. Each also comprises an amplifier 12 with a voltage amplification equal to 2 associated with a blocking device which operates under the action of an impulse from 11. The blocking device is provided so that amplifier 12 is blocked for a duration overlapping the retarded impulse from 1. This may be obtained by a delay line or a time constant device for widening the blocking impulse applied from 11.

A delay line 13, similar to delay line 9, is provided after the threshold amplifier 10 to delay the impulses going through it by a length of time equal to the time interval which separates two successive coded impulses.

There are thus four identical arrangements, each comprising elements such as 9, 10, 11, 12 and 13 which have just been described. The last stage 17 is a limiter-amplifier which, similarly to the preceding circuit 10, comprises a threshold device which lets through or not the fifth code impulse according to whether the impulse coming from circuit 8 is greater or smaller than the one-half reference level. A mixer 14 mixes the synchronizing impulses from 3 and the coded impulses from devices 5, 6, 7, 8 and 17.

Figure 2:
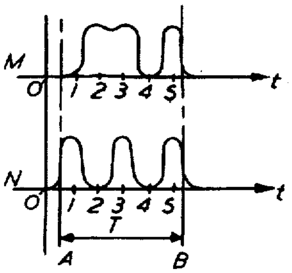

Referring again to Fig. 1, I show a set of amplitude modulated impulses and the envelope of these impulses which are comprised between the reference levels 0 and 1. As an example two impulses $M_1$ and $N_1$ of respective amplitudes 0.43 and 0.66 have been shown respectively below and above the one-half reference level. The corresponding coded impulses are shown in Fig. 2. The time interval T during which the coded impulses are transmitted is shown as AB. This time interval is divided into five equal intervals which are called elementary intervals 1, 2, 3, 4, 5 (in the case of a 5 element code). According to the code combination one impulse is or is not transmitted during each elementary interval.

When an impulse is transmitted in the third time interval, for example, we say that the third impulse is transmitted, and on the contrary that the third impulse is not transmitted if no impulse is transmitted during this time interval.

The upper part of Fig. 2 shows the coded impulses corresponding to amplitude $M_1$ (equal to 0.43) and the lower part of the figure those corresponding to amplitude $N_1$ (equal to 0.66).

The impulse $M_1$ of amplitude 0.43 which reaches circuit 5 of Fig. 3 cannot pass through amplifier 10 since its level is less than one-half. The first impulse is not transmitted and impulse $M_1$ is delayed by delay line and its amplitude doubled by amplifier 12. It reaches the following circuit 6 during the second elementary time interval with an amplitude equal to 0.86, i. e. with an amplitude greater than one-half reference level, and therefore passes through the threshold amplifier 10. A code impulse is transmitted in position 2, and an impulse with an amplitude $2(0.86-0.5)=0.72$ is transmitted to circuit 7 through delay line 13. This impulse reaches the following circuit 7 during the third elementary time interval, with an amplitude equal to $2\times0.36=0.72$. An impulse is transmitted by this circuit 7 in position 3, since the level applied to it exceeds the one-half reference level. On the contrary, the impulse transmitted to the next circuit 8 has an amplitude equal to $$2(0.72-0.5)=0.44$$

i. e., it is less than one-half, and no code impulse is transmitted in position 4. This impulse is amplitude doubled and applied with a level of 0.88 to the final limiter device 17 which lets an impulse pass into position 5 since the level exceeds the one-half reference level. It may be noted that a distinguishing feature of the coder is that the reference level remains constant on each comparison.

The code combination transmitted is that shown in the upper part of Fig. 2. It is easily seen that in the case of impulse $N_1$ of Fig. 1, which has an amplitude of 0.66, coded impulses are transmitted in positions 1, 3 and 5 as shown on the bottom part of Fig. 2.

The duration of the coded impulses depends upon the operating conditions of the transmitter. They may be very narrow or broad enough for two successive impulses to be adjacent.

Figure 4:
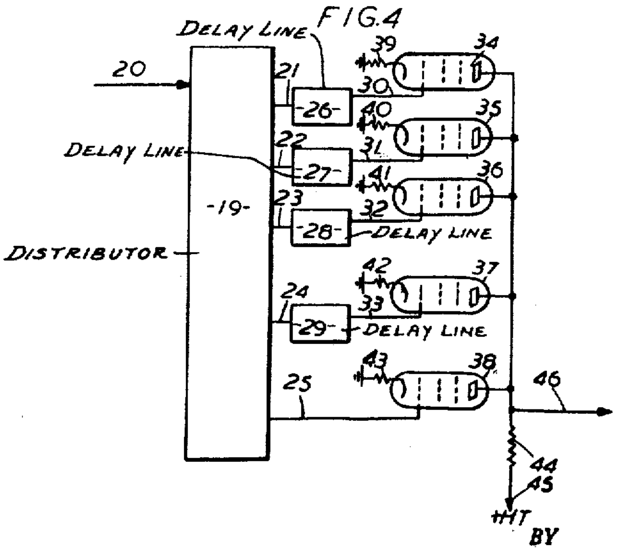
Fig. 4 is a block and schematic diagram of a receiving circuit for the coded impulses transmitted by the device shown in Fig. 3.

Fig. 4 shows an example of an embodiment of a decoding arrangement adapted to transform a set of coded impulses into an impulse whose amplitude is approximately equal to that of the original amplitude modulated impulse. This arrangement is designed for a 5 unit code, but may be extended to a code comprising more or less than 5 elements.

It comprises for instance a distributor 19 which receives from line 20 the reference or synchronising impulses and the coded impulses. This distributor, which may be of any known type, distributes the successive coded impulses belonging to the same group to wires 21, 22, 23, 24 and 25. Delay lines 26, 27, 28 and 29 are respectively provided on each wire, in such a way that these coded impulses reach respectively wires 30, 31, 32, 33 and 25 at the same moment. The impulse on wire 25 is the last impulse leaving the distributor and does not need to be delayed. The delay line 29 delays the impulse which flow through it by length of time equal to the time interval separating two successive coded impulses; delay line 30 delays the impulses which flow through it by a length of time equal to the time interval elapsing between three consecutive coded impulses, and so on. These impulses therefore reach the control grids of the vacuum tubes 34, 35, 36, 37 and 38 at the same time. The cathode resistances 39, 40, 41, 42 and 43 of these tubes are of such a value that the plate current in the respective vacuum tubes is proportional to the level corresponding to the impulse with which it is associated. All these currents add together in the plate resistance of the vacuum tube 44, which is connected, on the one hand to the plate of the tubes, and on the other hand to a source of high potential 45. In this way an impulse is obtained on wire 46 whose amplitude is approximately equal to that of the initial amplitude modulated pulse. A device (not shown) is used for directing to their respective channels the modulated impulses leaving the decoder according to a well known technique, where they are used to regulate the original modulating currents.

While I have described a particular embodiment of my invention for the purposes of illustration, it should be understood that various modifications and adaptations thereof may be made within the spirit of the invention as set forth in the appended claims.

What I claim is:

1. An electrical translator for converting sequentially timed pulse code groups to corresponding amplitude modulated pulses comprising delay means for the individual pulses of said code group to cause said individual pulses to be equally timed, a combining circuit, said combining circuit comprising a plurality of amplifiers of different gains for adjusting the amplitudes of said individual pulses in accordance with a predetermined code, means for applying said equally timed pulses to said combining circuit and means for adding together said pulses at the outputs of said amplifiers.

2. An electrical translator according to claim 1 wherein said delay means comprises a distributor and a plurality of delay devices each connected to an output circuit of said distributor.

3. An electrical translator according to claim 1 wherein said amplifiers each comprise a vacuum tube each having its gain adjusted in accordance with said code.

HENRI FEISSEL.

References Cited in the file of this patent

UNITED STATES PATENTS

| Number | Name | Date |
|---|---|---|
| 1,951,454 | Tiefenbacher | Mar. 20, 1934 |
| 2,145,332 | Bedford | Jan. 31, 1939 |
| 2,272,070 | Reeves | Feb. 3, 1942 |
| 2,361,766 | Hadekel | Oct. 31, 1944 |
| 2,401,405 | Bedford | June 4, 1946 |
| 2,403,561 | Smith | July 9, 1946 |
| 2,409,229 | Smith | Oct. 15, 1946 |
| 2,437,707 | Pierce | Mar. 16, 1948 |
| 2,438,908 | Goodall | Apr. 6, 1948 |
| 2,443,198 | Sallach | June 15, 1948 |
| 2,449,467 | Goodall | Sept. 14, 1948 |
| 2,451,044 | Pierce | Oct. 12, 1948 |
| 2,453,454 | Norwine | Nov. 9, 1948 |
| 2,453,461 | Schelleng | Nov. 9, 1948 |
| 2,465,840 | Blumlein | Mar. 29, 1949 |